United States Patent

[11] 3,622,822

[72] Inventor Warren A. Lofstrand
 Wethersfield, Conn.
[21] Appl. No. 16,453
[22] Filed Mar. 4, 1970
[45] Patented Nov. 23, 1971
[73] Assignee North American Philips Corporation
 New York, N.Y.

[54] ENCLOSURE FOR ELECTRIC MOTOR
 4 Claims, 4 Drawing Figs.
[52] U.S. Cl. .................................................. 310/89,
 310/43
[51] Int. Cl. ........................................... H02k 5/04
[50] Field of Search ............................................ 310/43, 88,
 89, 71, 273; 174/92, 138.4, 52, 91, 154; 317/99,
 120

[56] References Cited
 UNITED STATES PATENTS
 3,484,541 12/1969 Campbell ..................... 174/92 X
 3,112,148 11/1963 Wochner ...................... 174/92 X
 3,325,591 6/1967 Wahl ........................... 174/92 X
 2,726,689 12/1955 Busby .......................... 310/89 X
 3,479,540 11/1969 Fox ............................. 310/89 X Primary Examiner—D. F. Duggan
Assistant Examiner—B. A. Reynolds
Attorney—Donald P. Gillette ABSTRACT: An enclosure comprising a first semicylindrical shell and a second semicylindrically shell juxtaposed to the first shell, the two shells being formed to fit around an object of nonuniform shape. A flexible ligamentous portion integral with both shells connects them together and acts as a hinge. One cooperating portion of a releasable lock is provided on each of the shells, one portion of the lock comprising a pair of laterally extending resilient fingers, each of the fingers having a shoulder or barb at its free end and the other a protrusion with a channel to receive the fingers. The shoulders on the fingers extend beyond the channel and hook behind it so as to prevent their inadvertent withdrawal.

PATENTED NOV 23 1971 3,622,822

INVENTOR
WARREN A. LOFSTRAND

BY *Donald P. Gillette*

ATTORNEY 3,622,822

ENCLOSURE FOR ELECTRIC MOTOR

FIELD OF THE INVENTION

This invention relates to enclosures, and more particularly to a type of rigid enclosure to surround a device such as an electric motor and its associated gear train in order to provide protection against dust particles and other foreign substances which may tend to interfere with the efficient operation of such device should they be permitted access thereto.

BACKGROUND OF THE INVENTION

The invention arose out of a need for such an enclosure with respect to, but not limited to, the gear train which may be associated with an electric motor. It was found that the existing enclosures were unsuitable with respect to adaptation to the particular requirements herein described. For example, a basic one-piece cylindrical enclosure made out of rigid plastic or another rigid material is difficult to place in position surrounding a motor and the exposed gear train for the reason that its inflexibility results in potential damage to the electrical leads and other connections to the motor when such an enclosure is force fitted into the proper position. A more flexible material, which might stretch over the leads and connections to the motor, may tend to collapse after it is emplaced, thereby exposing the gear train to dust particles and other foreign substances harmful to the operation of the device. A two-piece enclosure formed to avoid the electrical leads and other connections to the motor by being assembled in position on the device requires the use of a separate hinge or hinges, with the result that such an enclosure is too expensive to manufacture or purchase on the market and cannot therefore be justifiably utilized.

BRIEF DESCRIPTION OF THE INVENTION

The present invention uses a pair of semicylindrical shell portions juxtaposed to each other around the device, and formed in such a way as to fit around any protrusions that extend from the device, such as electrical leads or other connections. These shell portions are part of an integral structure joined together by a flexible ligamentous portion which is not a separate hinge but is really a thin part of the material out of which the shells are constructed. It is less expensive to mold the enclosure in such a fashion than to employ a separate hinge to join the shells. A releasable lock having one cooperating portion on each of the shells is provided to secure the enclosure around the device. The lock comprises a pair of laterally extending resilient fingers on one shell portion and, on the other shell portion, a protrusion with a channel that is aligned with fingers when the two portions are folded together. The fingers are inserted into a channel, and barbs on the fingers extend beyond the channel on the opposite side from insertion and hook behind it to lock the two portions together. To release the lock, the fingers may be squeezed together, thereby moving the barbs out of contact with the corners at the far end of the channel to allow the fingers to be withdrawn. The barbs may also be beveled slightly to allow them to be squeezed together by lateral pressure to be forced through the channel to lock the two parts of the shell together.

One object of the present invention is to provide an enclosure which will effectively protect the enclosed device against dust particles and other alien substances having the tendency to interfere with efficient operation of the device should they be permitted access thereto.

Another object of the present invention is to provide an enclosure which may be installed around a device without interfering with electrical leads or other parts projecting from the device.

Still another object of the present invention is to provide an enclosure which is simple in construction.

A further object of the present invention is to provide an enclosure which is inexpensive to manufacture.

BRIEF DESCRIPTION OF THE DRAWINGS

For a better understanding of the present invention, reference may be had to the accompanying drawings in which.

BRIEF DESCRIPTION OF THE PREFERRED EMBODIMENTS

Figure 1:
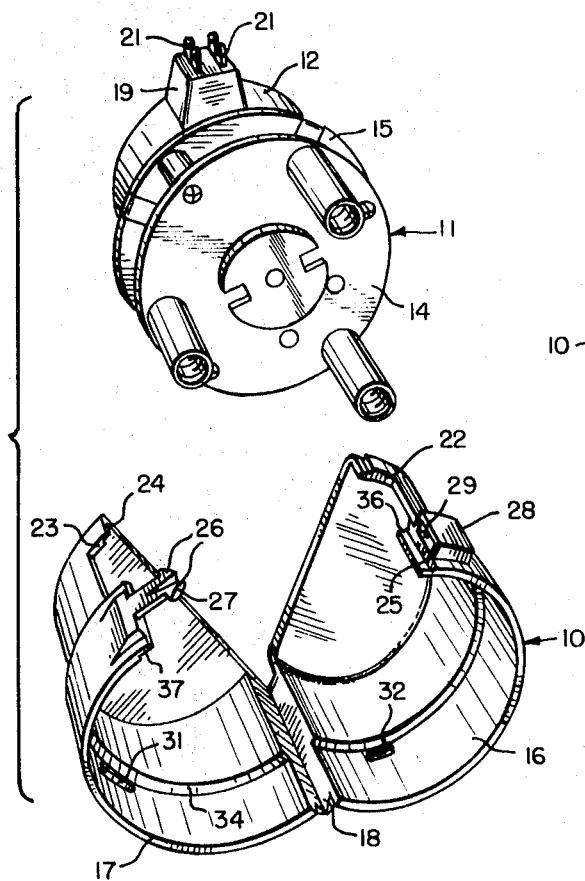
FIG. 1 is an exploded view of an enclosure constructed in accordance with the present invention and opened to receive one type of device such as an electric motor and its gear train.

Referring now to the drawings, FIG. 1 shows an enclosure according the the present invention generally indicated by reference numeral 10, opened to receive a device 11, such as a motor 12 and its gear train 13, which is located behind a support plate 14. The motor is mounted on a second support plate 15, which, together with the plate 14, defines the space within which the gear train is located. It is important to note that the enclosure of the present invention is in no way intended to be limited to use with a device such as that illustrated herein, and may be used with any device, the operation of which would be enhanced were it is to be protected from dust particles and other foreign substances.

The enclosure 10 comprises a pair of semicylindrical shells 16 and 17 molded of a suitable plastic material, such as polypropylene, and joined together along one longitudinal edge by a flexible ligamentous portion 18 which acts as a hinge and is formed out of the same plastic material as the shells 16 and 17.

In the particular embodiment illustrated, the device 11 has a protrusion 19 which supports the electrical leads 21 for the motor 12. In order to provide a snug fit around the device 11, the enclosure 10 has notches 22 and 23 located along the edges 24 and 25 of the shells 16 and 17 where these edges would otherwise come into contact with the protrusion 19 of the motor. When the enclosure is fitted into position around the device 11, the juxtaposition of the notches 22 and 23 forms an opening just large enough to allow the protrusion 19 to extend through to insure that the leads will not be injured by the assembly process.

Figure 2:
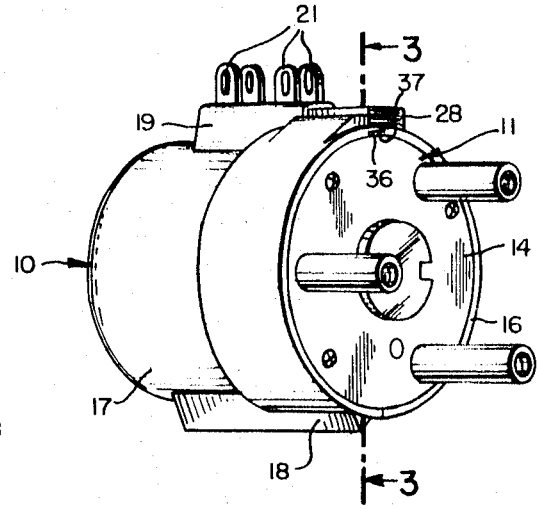
FIG. 2 is a perspective of the enclosure in position around the device shown in FIG. 1.

To hold the enclosure in the position illustrated in FIG. 2, an integral, releasable lock is provided with its components divided between the two shells 16 and 17. The shell 17 is provided with a pair of laterally integral fingers 26 which extend beyond the edge 24, and each of which is provided with a shoulder, or barb, 27 and the fingers are side by side with their respective barbs facing in opposite directions. The cooperating portion of the releasable lock is a protrusion 28 located on the other shell 16 adjacent the edge 25.

When the enclosure 10 is fitted into position around the device 11, the fingers 23 are aligned with an opening, or channel, 29 in the protrusion 28. The fingers 26 are resilient and are slightly tapered to permit them to be squeezed together in order to pass through the channel 29, and after the barbs 27 have passed completely through the passage, the fingers spring apart and the barbs catch behind corners on the far side of the protrusion 28. The enclosure is thus locked in place and may not be easily inadvertently opened and removed from the device 11. However, it is possible to squeeze the ends of the fingers 26 together enough to unhook the barbs 27 from the corners at the end of the channel 29 on the far side of the protrusion and pull the fingers back through the channel.

Figure 3:
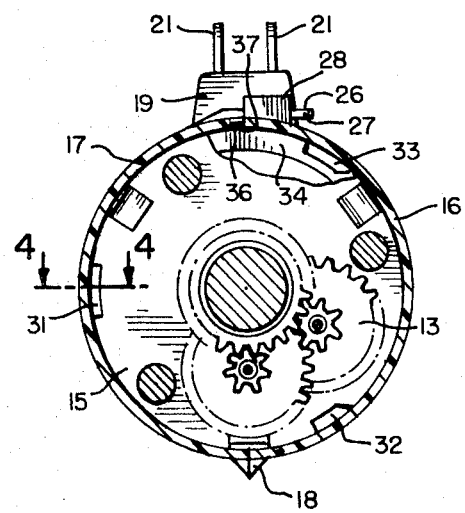
FIG. 3 is a cross-sectional view, taken along the line 3—3 in FIG. 2, of a device enclosed by the cover in FIG. 1.
Figure 4:
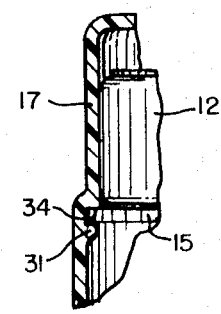
FIG. 4 is a cross-sectional view of a portion of the enclosure taken along the line 4—4 of FIG. 3.

The shells 16 and 17 have three internal promontories 31–33, shown in FIGS. 3 and 4. As shown in FIG. 4, these promontories are axially spaced from an internal shoulder 34 by a distance approximately equal to the thickness of the plate 15 for the purpose of capturing the support plate 15 of the device 11 on which the motor 12 is mounted. When the enclosure is thus mounted on the device, and the support plate 15 is captured between the abutment surface and the promontories, any tendency for the enclosure to move axially along the device in either direction and thus to expose any part of the device to dust particles or other foreign substances is reduced to a minimum. As a further aid in keeping out dust, the edge 25 has a lip 36 that fits into a recess 37 in the edge 24.

What is claimed is:

1. An electric motor comprising:
   A. A generally cylindrical body;
   B. Terminal means extending from the side of said body;
   C. At least one flange at one end of said cylindrical body and extending radially therebeyond;
   D. A plastic enclosure surrounding said cylindrical body and comprising:
      1. first and second semicylindrical plastic shell portions,
      2. a flexible hinge portion integrally formed joining contiguous edges of said first and second semicylindrical shell portions,
      3. a notch in an edge portion of said first semicylindrical shell portion diametrically opposite said flexible hinge to fit closely around said terminal; and
   E. Locking means adjacent the edges of said first and second semicylindrical shell portions diametrically opposite said hinge to lock said shell portions around said motor, said locking means comprising:
      1. integral means defining a channel on said first semicylindrical shell portion, and resiliently deformable fingers on the other of said shell portions fitting into and locking with said means defining said channel.

2. The motor of claim 1 in which each of said semicylindrical shell portions comprises:
   A. A first semicylindrical section having a diameter to fit around said generally cylindrical body;
   B. A second semicylindrical section of larger diameter than said first diameter to fit around said flange; and
   C. A shoulder between said first sections and said second sections.

3. The motor of claim 2 comprising, in addition, a plurality of inwardly extending promontories longitudinally spaced along said second semicylindrical sections from said shoulder by a distance at least substantially equal to the thickness of said flange to capture said flange between said promontories and said shoulder.

4. The motor of claim 2 comprising, in addition:
   A. A second flange longitudinally spaced from said first-named flange; and
   B. Gears between said flanges forming a gearbox for said motor, the longitudinal dimension of said second semicylindrical sections being substantially equal to the overall distance between the distal faces of said flanges, whereby said second semicylindrical sections comprise an enclosure for said gearbox.

* * * * *